(12) United States Patent
Huang

(10) Patent No.: US 7,370,423 B1
(45) Date of Patent: May 13, 2008

(54) LONG-ARM GARDENING SHEARS HAVING ANGLE ADJUSTABLE FUNCTION

(75) Inventor: Yao-Chung Huang, Changhua Hsien (TW)

(73) Assignee: Ho Cheng Garden Tools Co., Ltd., Changhua Hsien (TW)

( * ) Notice: Subject to any disclaimer, the term of this patent is extended or adjusted under 35 U.S.C. 154(b) by 569 days.

(21) Appl. No.: 11/054,972

(22) Filed: Feb. 10, 2005

(51) Int. Cl.
*B26B 19/02* (2006.01)

(52) U.S. Cl. .............................. 30/199; 30/193; 30/212; 30/252; 30/253

(58) Field of Classification Search ................... 30/132, 30/194, 199, 211, 212, 252, 253, 193, 254, 30/527, 250; 403/65, 84, 92, 94, 96, 97, 403/103, 104, 106, 107
See application file for complete search history.

(56) References Cited

U.S. PATENT DOCUMENTS

| | | | | |
|---|---|---|---|---|
| 2,587,586 A | * | 3/1952 | Bernardi | 30/248 |
| 2,921,773 A | * | 1/1960 | Hoelzer | 254/129 |
| 5,358,352 A | * | 10/1994 | Klarhorst | 403/104 |
| 5,940,977 A | * | 8/1999 | Moores, Jr. | 30/392 |
| 6,481,106 B1 | * | 11/2002 | Paloheimo et al. | 30/199 |
| 6,948,197 B1 | * | 9/2005 | Chen | 5/93.1 |
| 7,251,896 B2 | * | 8/2007 | Khubani | 30/199 |

* cited by examiner

*Primary Examiner*—Timothy V. Eley
(74) *Attorney, Agent, or Firm*—Alan Kamrath; Kamrath & Associates PA

(57) ABSTRACT

A pair of long-arm gardening shears include a main body, a first casing, a second casing, a cutting blade assembly, a retaining member, a push button, and a spring. Thus, the angle between the cutting blade assembly and the main body is adjusted so that the length of the long-arm gardening shears is adjusted, thereby facilitating a user operating the long-arm gardening shears to shear the lawn at a lower height and the branches at a higher level. In addition, the use only needs to press the push button so as to rotate the cutting blade assembly and to release the push button so as to lock the cutting blade assembly, thereby facilitating the user adjusting the angles of the long-arm gardening shears.

17 Claims, 7 Drawing Sheets

LONG-ARM GARDENING SHEARS HAVING ANGLE ADJUSTABLE FUNCTION

BACKGROUND

1. Field of the Invention

The present invention relates to a pair of long-arm gardening shears, and more particularly to a pair of long-arm gardening shears having an angle adjustable function.

2. Description of the Related Art

A conventional pair of long-arm gardening shears has a linear shape with a greater length of shearing the branches or leaves at a higher level. Another conventional pair of long-arm gardening shears has a bent shape with a bent portion for shearing the lawn at a lower height. However, the above-mentioned conventional long-arm gardening shears only have a single function, thereby limiting the versatility of the long-arm gardening shears, and thereby causing inconvenience to a user when needing to shear the branches or leaves at a higher level and to shear the lawn at a lower height simultaneously.

SUMMARY OF THE INVENTION

In accordance with the present invention, there is provided a pair of long-arm gardening shears, comprising a main body having an end portion provided with a pivot seat; a first casing rotatably mounted on the main body and having an inside formed with a pivot hole pivotally mounted on the pivot seat of the main body; a second casing rotatably mounted on the main body and combined with the first casing; a cutting blade assembly secured on the first casing and the second casing; a retaining member secured on the first casing and having an inside formed with a through hole having a periphery provided with a plurality of engaging grooves; a push button movably mounted in the retaining member and having a first side provided with a catch block received in the pivot hole of the first casing and a second side having a periphery provided with a plurality of engaging teeth detachably engaged with the engaging grooves of the retaining member; and a spring biased between the first casing and the push button to push the push button toward the retaining member to engage the engaging teeth of the push button with the engaging grooves of the retaining member, so that the push button is detachably secured on the retaining member.

The primary objective of the present invention is to provide a pair of long-arm gardening shears having an angle adjustable function.

Another objective of the present invention is to provide a pair of long-arm gardening shears, wherein the angle between the cutting blade assembly and the main body is adjusted so that the length of the long-arm gardening shears is adjusted arbitrarily, thereby facilitating a user operating the long-arm gardening shears to shear the lawn at a lower height and the branches at a higher level.

A further objective of the present invention is to provide a pair of long-arm gardening shears, wherein the angle between the cutting blade assembly and the main body is adjusted arbitrarily to fit users of different height and to fit the shearing angles of the lawn, thereby enhancing the versatility of the long-arm gardening shears.

A further objective of the present invention is to provide a pair of long-arm gardening shears, wherein the user only needs to press the push button so as to rotate the cutting blade assembly and to release the push button so as to block the cutting blade assembly, thereby facilitating the user adjusting the angles of the long-arm gardening shears.

Further benefits and advantages of the present invention will become apparent after a careful reading of the detailed description with appropriate reference to the accompanying drawings.

DETAILED DESCRIPTION OF THE INVENTION

Figure 1:
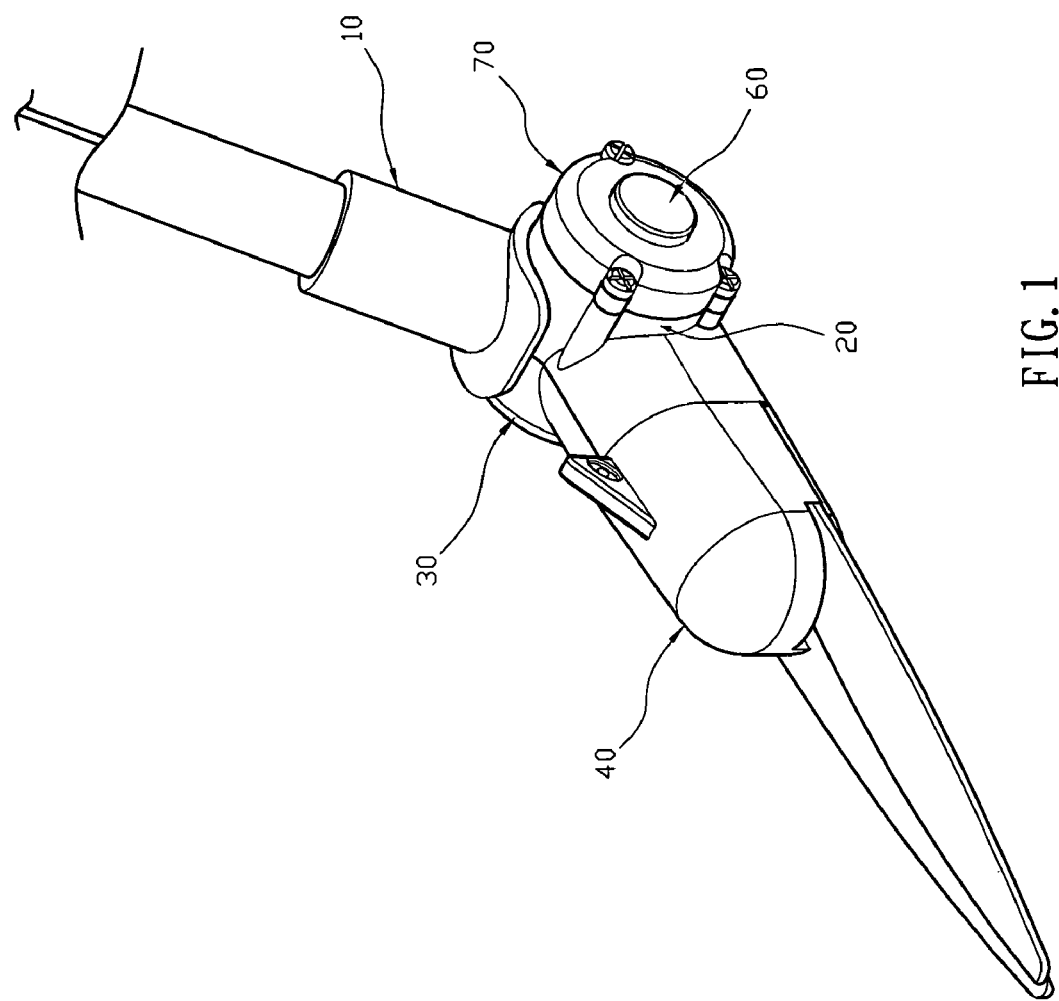
FIG. 1 is a perspective view of a pair of long-arm gardening shears in accordance with the preferred embodiment of the present invention.
Figure 2:
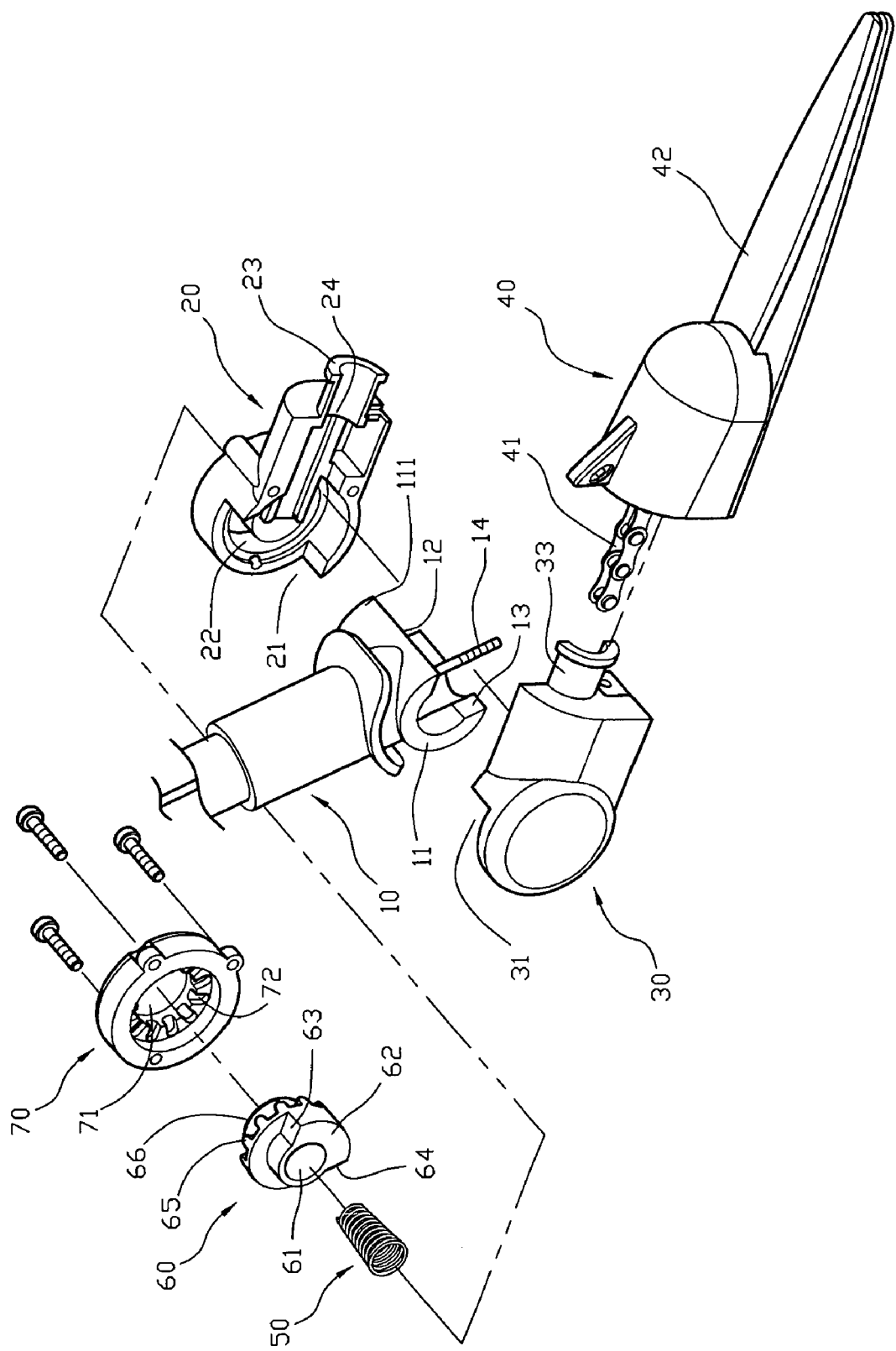
FIG. 2 is an exploded perspective view of the long-arm gardening shears as shown in FIG. 1.
Figure 3:
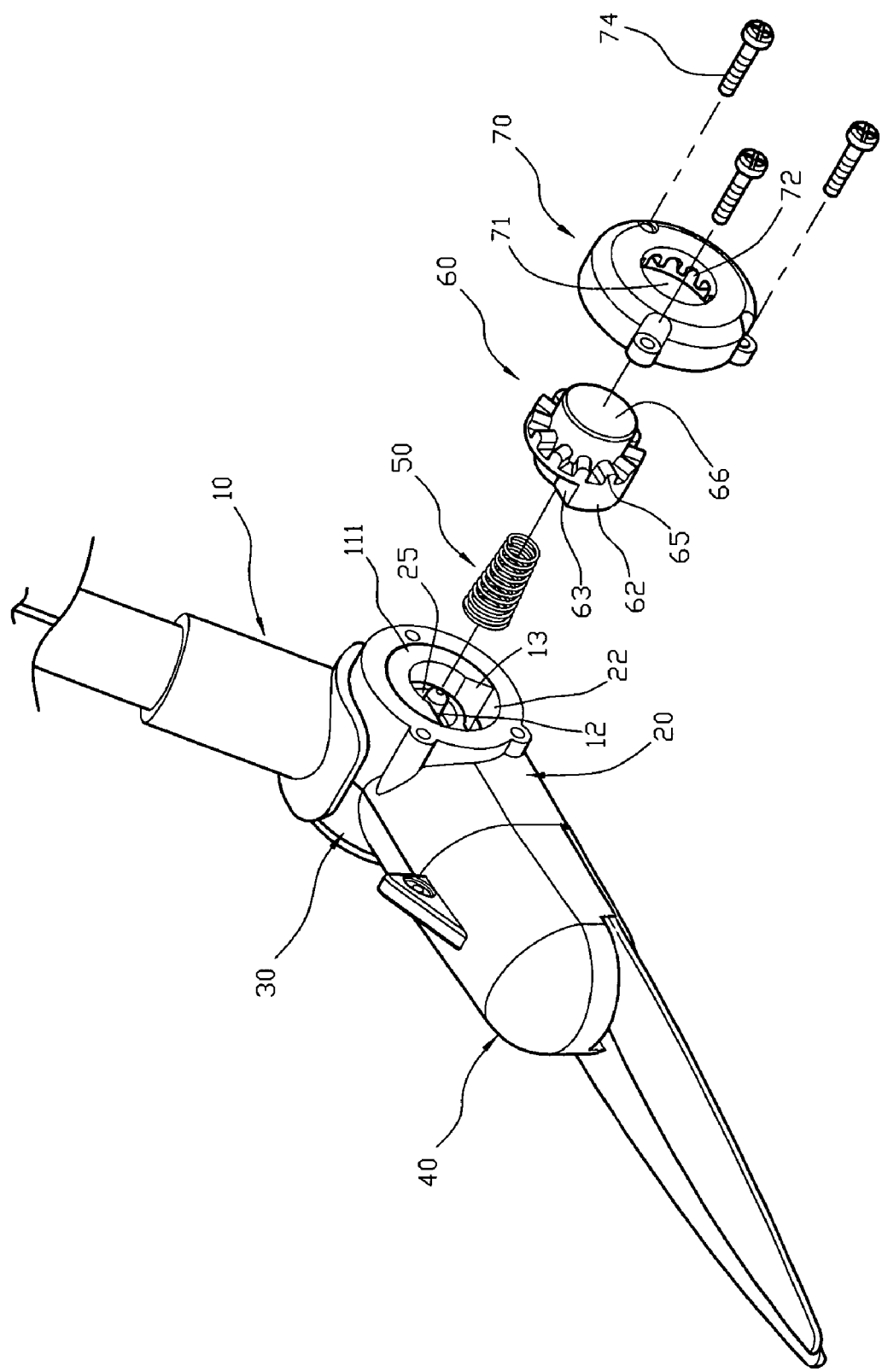
FIG. 3 is an exploded perspective view of the long-arm gardening shears as shown in FIG. 1.
Figure 4:
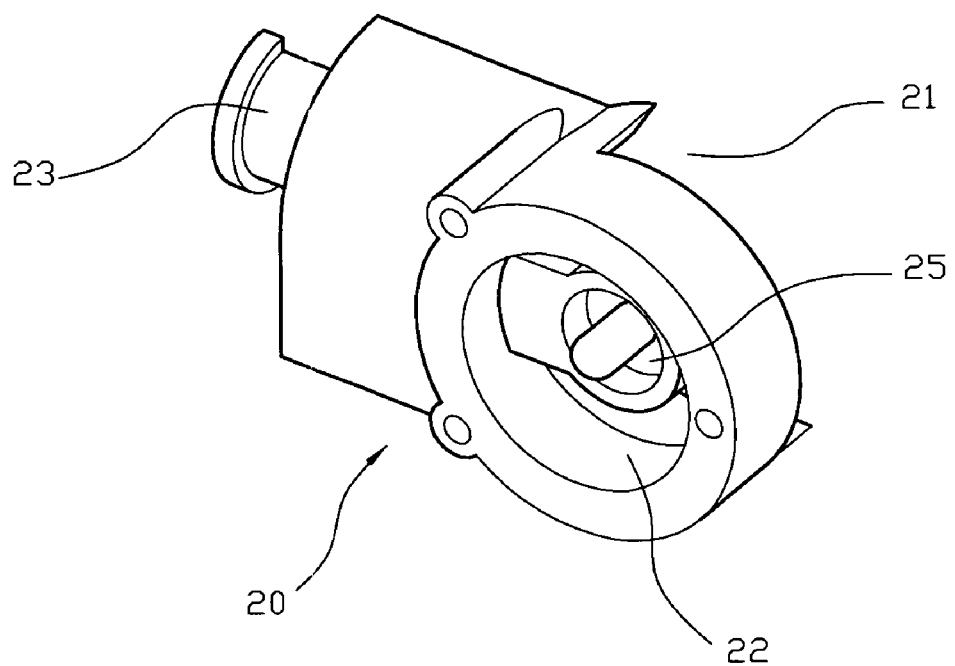
FIG. 4 is a perspective view of a first casing of the long-arm gardening shears as shown in FIG. 1.
Figure 5:
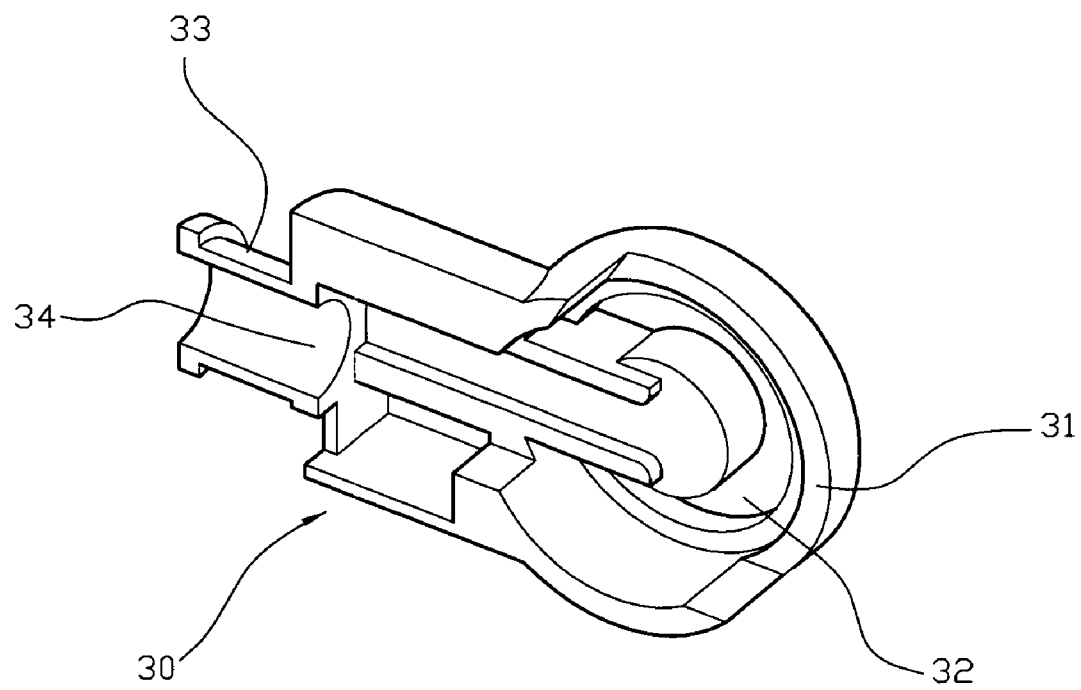
FIG. 5 is a perspective view of a second casing of the long-arm gardening shears as shown in FIG. 1.

Referring to the drawings and initially to FIGS. 1-7, a pair of long-arm gardening shears in accordance with the preferred embodiment of the present invention comprise a main body 10, a first casing 20, a second casing 30, a cutting blade assembly 40, a retaining member 70, a push button 60, and a spring 50.

The main body 10 has an end portion provided with a substantially C-shaped pivot seat 11 having an opening formed with a first stop portion 12 and a second stop portion 13. The pivot seat 11 of the main body 10 has a side formed with an extension 111 extending outward therefrom. The main body 10 has a central portion provided with a link 14 extending outward from the end portion thereof.

The first casing 20 is rotatably mounted on the main body 10 and has an inside formed with a substantially C-shaped pivot hole 22 pivotally mounted on the pivot seat 11 of the main body 10 and a spring seat 25 located in the pivot hole 22. In addition, the extension 111 of the pivot seat 11 of the main body 10 is pivotally mounted in and flush with the pivot hole 22 of the first casing 20. The first casing 20 has a side formed with a cutout 21. The first casing 20 has an end portion provided with a connecting portion 23 having an inside formed with a passage 24.

The second casing 30 is rotatably mounted on the main body 10 and combined with the first casing 20. The second casing 30 has an inside formed with a substantially C-shaped pivot hole 32 pivotally mounted on the pivot seat 11 of the main body 10. The second casing 30 has a side formed with a cutout 31. The second casing 30 has an end portion provided with a connecting portion 33 having an inside formed with a passage 34.

The cutting blade assembly 40 is secured on the first casing 20 and the second casing 30 and includes two cutting blades 42, and a drive chain 41 having a first end connected to the link 14 and a second end connected to the two cutting blades 42 to drive the two cutting blades 42 to operate. Preferably, the cutting blade assembly 40 is mounted on the connection portion 23 of the first casing 20 and the connecting portion 33 of the second casing 30.

The retaining member 70 is secured on the first casing 20 by screws 74 and has an inside formed with a through hole 71 having a periphery provided with a plurality of engaging grooves 72.

The push button 60 is movably mounted in the retaining member 70 and has a first side provided with a substantially sector-shaped catch block 62 received in the pivot hole 22 of the first casing 20 and rested on the pivot seat 11 of the main body 10 and a second side having a periphery provided with a plurality of engaging teeth 65 detachably with the engaging grooves 72 of the retaining member 70. The catch block 62 of the push button 60 is located between the first stop portion 12 and the second stop portion 13 of the pivot seat 11 of the main body 10 and has a first end formed with a first catch portion 63 that is movable to abut the first stop portion 12 of the pivot seat 11 of the main body 10 and a second end formed with a second catch portion 64 that is movable to abut the second stop portion 13 of the pivot seat 11 of the main body 10. The second side of the push button 60 has a central portion provided with a press portion 66 movably mounted in and protruded outward from the through hole 71 of the retaining member 70. The push button 60 has an inside formed with a receiving recess 61.

The spring 50 is biased between the first casing 20 and the push button 60 to push the push button 60 toward the retaining member 70 to engage the engaging teeth 65 of the push button 60 with the engaging grooves 72 of the retaining member 70, so that the push button 60 is detachably secured on the retaining member 70. Preferably, the spring 50 has a first end received in the spring seat 25 of the first casing 20 and a second end received in the receiving recess 61 of the push button 60.

Figure 6:
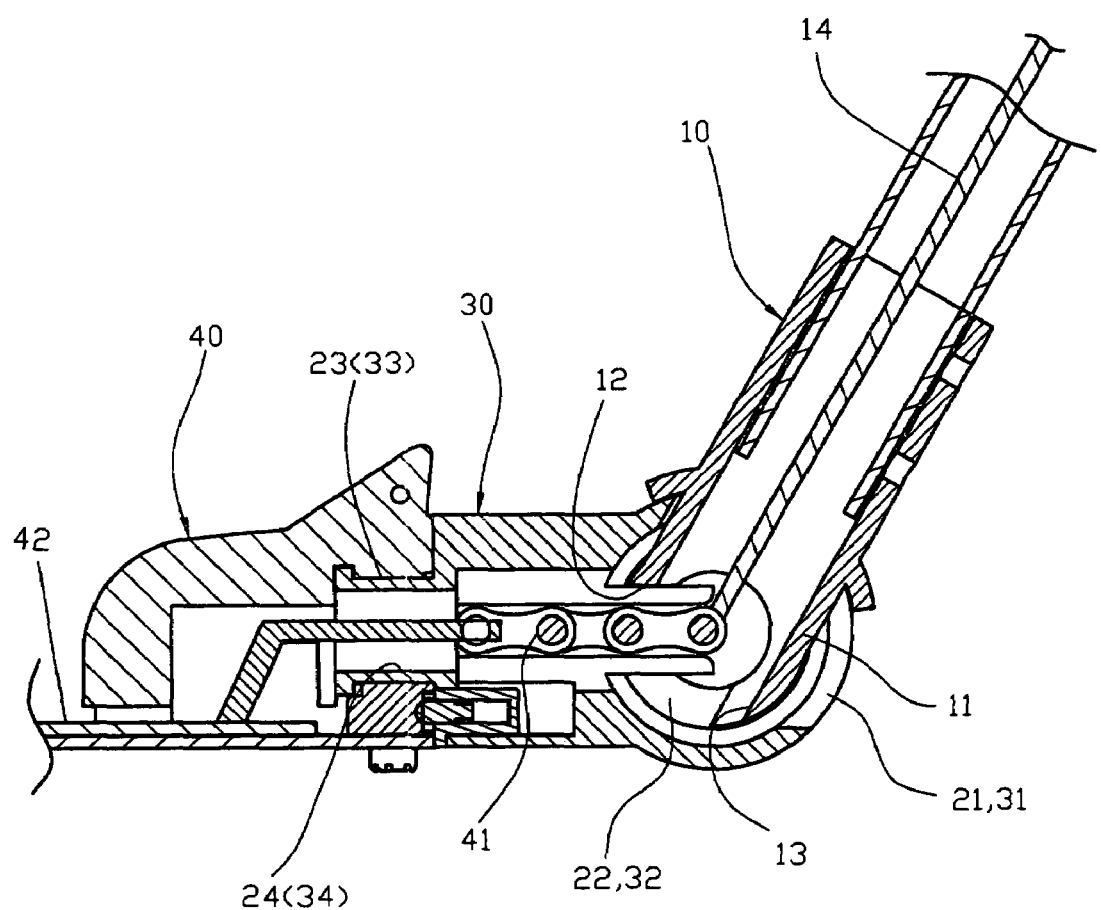
FIG. 6 is a plan cross-sectional view of the long-arm gardening shears as shown in FIG. 1.
Figure 7:
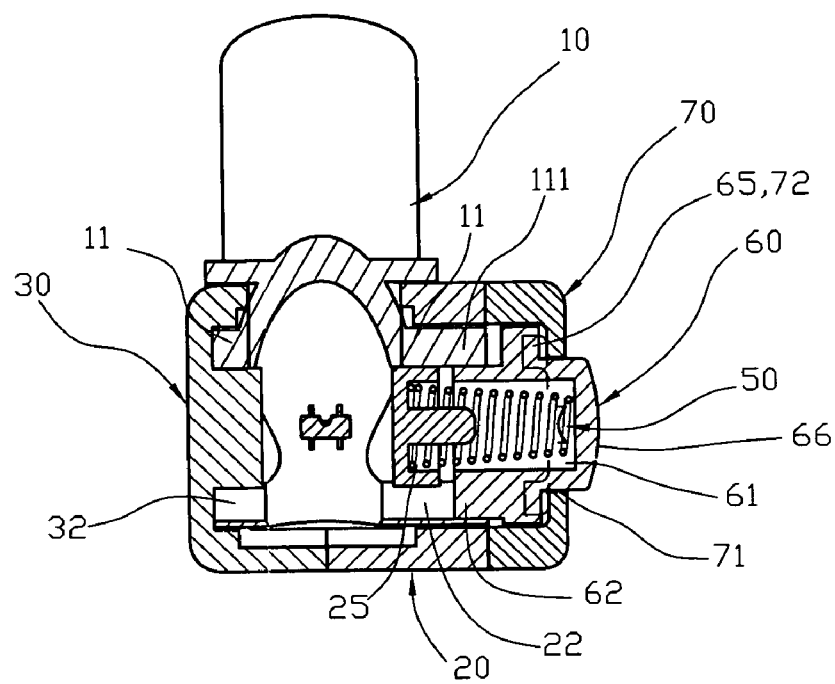
FIG. 7 is a plan cross-sectional view of the long-arm gardening shears as shown in FIG. 1.
Figure 8:
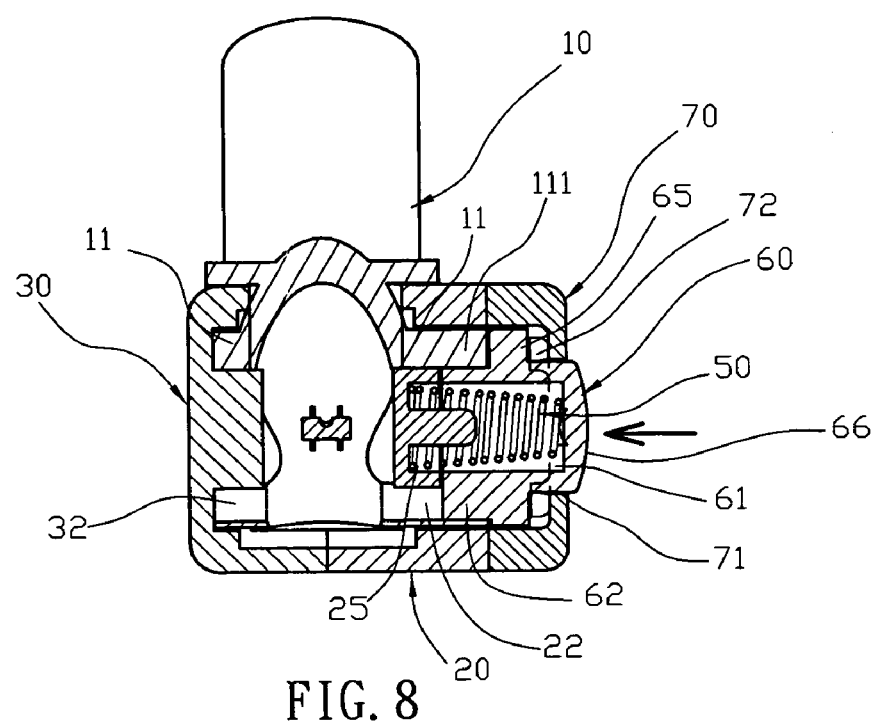
FIG. 8 is a schematic operational view of the long-am gardening shears as shown in FIG. 7.
Figure 9:
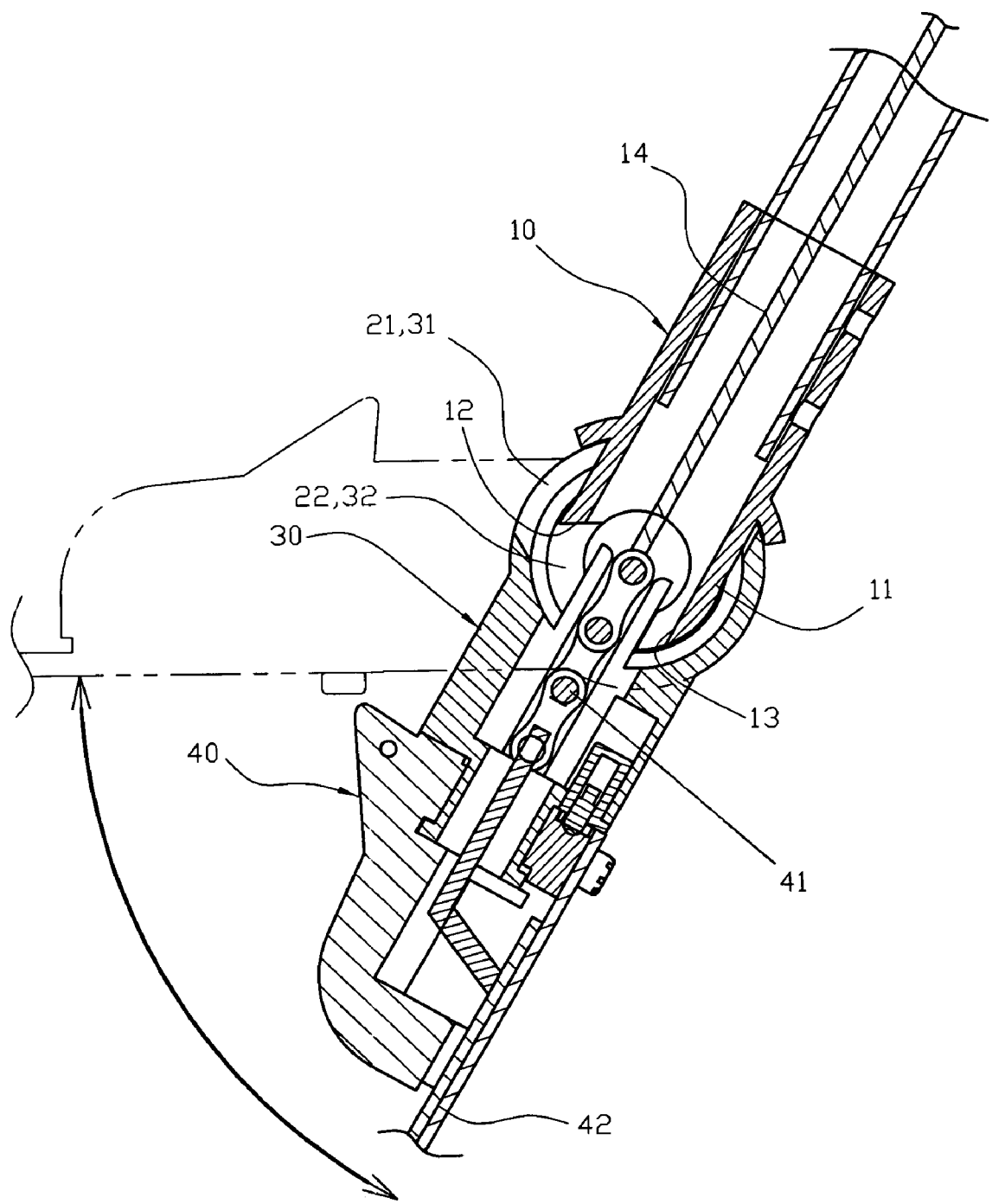
FIG. 9 is a schematic operational view of the long-arm gardening shears as shown in FIG. 6.

In operation, referring to FIGS. 6-9 with reference to FIGS. 1-5, when the press portion 66 of the push button 60 is pressed inward by a user, the push button 60 is moved outward relative to the retaining member 70, so that the engaging teeth 65 of the push button 60 are disengaged from the engaging grooves 72 of the retaining member 70 as shown in FIG. 8. Thus, the pivot seat 11 of the main body 10 is provided in the pivot hole 22 of the first casing 20 and the pivot hole 32 of the second casing 30, so that the first casing 20, the second casing 30, the cutting blade assembly 40 and the retaining member 70 are rotatable relative to the pivot seat 11 of the main body 10 between the first stop portion 12 and the second stop portion 13 of the pivot seat 11 of the main body 10 to move from the position as shown in FIG. 6 to the position as shown in FIG. 9 so as to adjust the angle between the cutting blade assembly 40 and the main body 10.

After the angle adjustment of the cutting blade assembly 40, the force applied on the press portion 66 of the push button 60 is removed, so that the push button 60 is pushed by the restoring force of the spring 50 to return to its original position as shown in FIG. 7 to engage the engaging teeth 65 of the push button 60 with the engaging grooves 72 of the retaining member 70, so that the push button 60 is secured on the retaining member 70.

Accordingly, the angle between the cutting blade assembly 40 and the main body 10 is adjusted so that the length of the long-arm gardening shears is adjusted arbitrarily, thereby facilitating a user operating the long-arm gardening shears to shear the lawn at a lower height and the branches at a higher level. In addition, the angle between the cutting blade assembly 70 and the main body 10 is adjusted arbitrarily to fit users of different height and to fit the shearing angles of the lawn, thereby enhancing the versatility of the long-arm gardening shears. Further, the user only needs to press the push button 60 so as to rotate the cutting blade assembly 40 and to release the push button 60 so as to lock the cutting blade assembly 40, thereby facilitating the user adjusting the angles of the long-arm gardening shears.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pair of long-arm gardening shears, comprising:
  a main body having an end portion provided with a pivot seat;
  a first casing rotatably mounted on the main body and having an inside formed with a pivot hole pivotally mounted on the pivot seat of the main body;
  a second casing rotatably mounted on the main body and combined with the first casing;
  a cutting blade assembly secured on the first casing and the second casing;
  a retaining member secured on the first casing and having an inside formed with a through hole having a periphery provided with a plurality of engaging grooves;
  a push button movably mounted in the retaining member and having a first side provided with a catch block received in the pivot hole of the first casing and a second side having a periphery provided with a plurality of engaging teeth detachably engaged with the engaging grooves of the retaining member; and
  a spring biased between the first casing and the push button to push the push button toward the retaining member to engage the engaging teeth of the push button with the engaging grooves of the retaining member, so that the push button is detachably secured on the retaining member.

2. The long-arm gardening shears in accordance with claim 1, wherein the pivot seat of the main body is substantially C-shaped.

3. The long-arm gardening shears in accordance with claim 1, wherein the pivot seat of the main body has an opening formed with a first stop portion and a second stop portion.

4. The long-arm gardening shears in accordance with claim 3, wherein the catch block of the push button is located between the first stop portion and the second stop portion of the pivot seat of the main body and has a first end formed with a first catch portion that is movable to abut the first stop portion of the pivot seat of the main body and a second end formed with a second catch portion that is movable to abut the second stop portion of the pivot seat of the main body.

5. The long-arm gardening shears in accordance with claim 1, wherein the pivot seat of the main body has a side formed with an extension extending outward therefrom and pivotally mounted in and flush with the pivot hole of the first casing.

6. The long-arm gardening shears in accordance with claim 1, wherein the main body has a central portion provided with a link extending outward from the end portion thereof, and the cutting blade assembly includes two cutting blades, and a drive chain having a first end connected to the link and a second end connected to the two cutting blades to drive the two cutting blades to operate.

7. The long-arm gardening shears in accordance with claim 1, wherein the pivot hole of the first casing is substantially C-shaped.

8. The long-arm gardening shears in accordance with claim 1, wherein the first casing has a spring seat located in the pivot hole, the push button has an inside formed with a receiving recess, and the spring has a first end received in the spring seat of the first casing and a second end received in the receiving recess of the push button.

9. The long-arm gardening shears in accordance with claim 1, wherein the first casing has a side formed with a cutout.

10. The long-arm gardening shears in accordance with claim 1, wherein the first casing has an end portion provided with a connecting portion having an inside formed with a passage, the second casing has an end portion provided with a connecting portion having an inside formed with a passage, and the cutting blade assembly is mounted on the connecting portion of the first casing and the connecting portion of the second casing.

11. The long-arm gardening shears in accordance with claim 1, wherein the second casing has an inside formed with a pivot hole pivotally mounted on the pivot seat of the main body.

12. The long-arm gardening shears in accordance with claim 11, wherein the pivot hole of the second casing is substantially C-shaped.

13. The long-arm gardening shears in accordance with claim 11, wherein the pivot seat of the main body is pivotally mounted in the pivot hole of the first casing and the pivot hole of the second casing, so that the first casing, the second casing, the cutting blade assembly and the retaining member are rotatable relative to the pivot seat of the main body.

14. The long-arm gardening shears in accordance with claim 1, wherein the second casing has a side formed with a cutout.

15. The long-arm gardening shears in accordance with claim 1, wherein the catch block of the push button is substantially sector-shaped.

16. The long-arm gardening shears in accordance with claim 1, wherein the catch block of the push button is rested on the pivot seat of the main body.

17. The long-arm gardening shears in accordance with claim 1, wherein the second side of the push button has a central portion provided with a press portion movably mounted in and protruded outward from the through hole of the retaining member.

* * * * *